June 19, 1923.
P. DELLA MONICA
GARDEN IMPLEMENT
Filed April 28, 1921
1,458,987
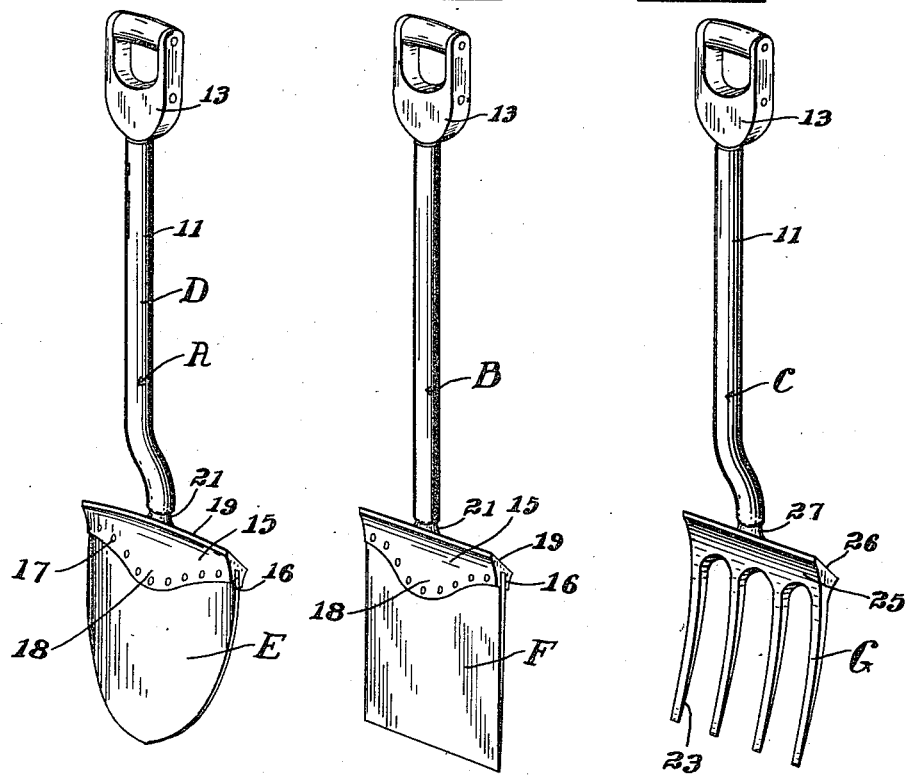
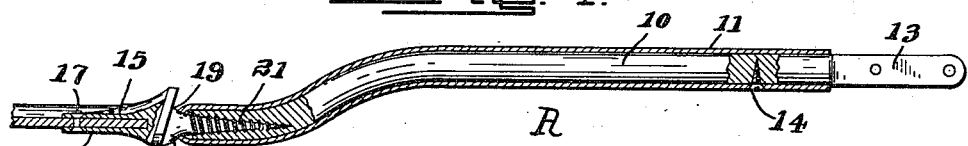
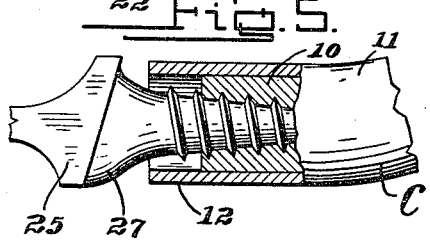
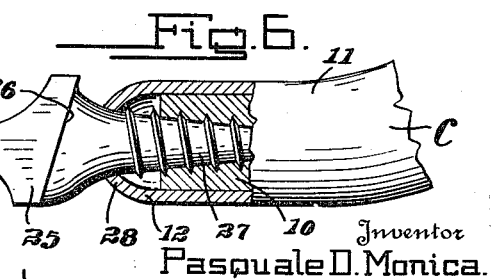
Inventor
Pasquale D. Monica.
By Lancaster and Allwine
Attorney Patented June 19, 1923.

1,458,987

UNITED STATES PATENT OFFICE.

PASQUALE DELLA MONICA, OF HARRISON, NEW YORK.

GARDEN IMPLEMENT.

Application filed April 28, 1921. Serial No. 465,273.

*To all whom it may concern:*

Be it known that I, PASQUALE DELLA MONICA, a citizen of the United States, residing at Harrison, in the county of Westchester and State of New York, have invented certain new and useful Improvements in Garden Implements, of which the following is a specification.

This invention relates to hand implements of the spade or shovel type, and the primary objects of the invention are; first, to provide a novel handle construction for the implement, which will add strength and rigidity thereto, so as to permit the implement to be used for heavy work, and to prevent the breaking of the handle; second, to provide a novel means for connecting the handle to the blade portion; third, a novel means for strengthening the blade, which will permit the removal of the blade when the same becomes worn or unfit for use; and fourth, a novel means for facilitating the insertion of the implement into the ground or other material being handled.

More specifically, the primary object of the invention is to provide a complete metallic casing or covering for the ordinary wooden handle so as to add strength thereto and to prevent the easy breaking thereof, and to provide the upper edge of the blade of the implement with a relatively broad inclined foot receiving face, whereby the blade can be readily and easily inserted into the ground or other material being handled.

A still further object of the invention is to provide a hand implement of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a perspective view of a shovel constructed in accordance with my invention, and provided with a curved or offset handle.

Figure 2 is a perspective view of a spade constructed in accordance with my invention.

Figure 3 is a perspective view of a spade fork construction in accordance with the invention; the handle being of the curved or offset type.

Figure 4 is a fragmentary longitudinal sectional view through the implement having a handle of the curved or offset type, illustrating the improved handle construction, and the means of connecting the blade to said handle.

Figure 5 is an enlarged fragmentary sectional view illustrating the means of connecting the blade with a handle, and showing the arrangement of the metallic casing for the handle, before being bent into frictional contact with the shank of the blade.

Figure 6 is a similar view showing the casing bent into engagement with the shank or attaching screw of the blade to prevent rotation of the blade in relation to the handle.

Referring to the drawings in detail, wherein similar reference characters designate corresponding parts throughout the several views, the letter A indicates a shovel constructed in accordance with the invention; B, a spade constructed in accordance with the invention; and C, a spade fork constructed in accordance with the invention.

The handles for these implements are desigated by the letters D and are of substantially the same construction, and can be formed straight as shown in Figure 2, or curved as shown in Figures 1, 3, and 4.

Each of the handles D includes a wooden core 10, and a tubular metallic protecting casing 11, which gives the desired strength to the handle, and the necessary protection for the wooden core to prevent the ready breaking or wearing out thereof. The core 10 can be forced into the tubular metallic casing 11, in any preferred manner, and in the case the handle is to be of the curved or offset type, as shown in Figures 1, 3, and 4, the wood can be suitably treated, if so desired, in order to permit the same to readily take the configuration of the casing. The casing 11 extends from one end of the wooden core to the other, and protrudes slightly beyond the forward or lower end thereof to provide a sleeve or ferrule 12 as clearly shown in Figure 5 of the drawing. The opposite end of the wooden core 10 can be provided with any suitable or preferred type of hand grip 13, as clearly shown in the drawings.

If so desired, suitable screw 14 may be inserted into the handle adjacent to the opposite ends thereof, in order to prevent displacement of the wooden core 10, in case the same is separated in the tubular metallic casing 11 intermediate its ends.

The blades of the shovel A, and the spade B are designated respectively by the letters E and F, and these blades are constructed substantially the same, and each includes a reinforcing breast 15, which extends transversely across the upper or inner edge of the blade. The reinforcing breast 15 is provided at its inner or lower edge with a slot 16 to receive the blade, and the blade can be detachably secured thereto by means of a suitable fastening element 17. Thus the blade can be removed when the same becomes worn or broken. If so desired, the central portion of the breast 15 may be provided with extensions 18 in order to further reinforce the central portion of the blade. The upper or outer edge of the breast 15, is formed relatively broad, and is provided with a rearwardly inclined face 19, which forms a footrest, in order to facilitate the insertion of the blade into the ground. The inclination of this face forms an important part of the invention as it is found in actual practice that the inclination of the face permits a direct thrust of the foot in order to insert the blade into the ground or other material being handled. The central portion of the breast 15 is provided with a tapered shank 21 which is adapted to be inserted into the wooden core 10. At the point of connection with the threaded shank 21 with the breast 15, the shank is gradually increased in diameter as at 22, for a purpose which will be hereinafter more fully described.

The blade of the fork spade C is designated by the letter G and includes a plurality of prongs 23, which are formed on the transversely extending body portion 25, which is formed relatively broad and has its upper edge inclined to provide the relatively broad foot rest 26, which is the same as or similar to the inclined foot rest 19, of the blades E and F. The body portion 26 also is provided with a threaded shank 27 which is constructed identically the same as the shank 21, and this shank is also fitted into the lower end of the wooden core 10.

After the screw threaded shank has been placed in position in the handle the sleeve portion 12 of the tubular casing 11 is bent inwardly, as at 28, into frictional contact with the enlarged portion 22 of the shank, and the handle and blade can then be given a further twist, which will feed the contracted end 28 of the shell or tubular casing 11 into tight and frictional contact with the enlarged portion 22 of the shank, and thus absolutely preclude movement of the blade in relation to their handle.

From the foregoing description, it can be seen that an improved hand implement has been provided, of exceptionally simple construction, which will add strength and rigidity to the implement, and permit the use thereof for heavy work without danger of breaking the handle.

Changes in details may be made without departing from the spirit or scope of this invention; but,

I claim:

1. A hand implement comprising a handle including a wooden core, and a metallic casing therefor extending the entire length thereof, and a blade including a threaded shank arranged for insertion in the wooden core, the metallic casing being bent into frictional contact with the shank to prevent rotation thereof in relation to said core.

2. A hand implement comprising a handle including a wooden core and a metallic tubular casing thereof extending the entire length thereof, a hand grip formed on one end of the wooden core, and a blade carried by the opposite end of the wooden core including a threaded shank for insertion into the wooden core, and a tubular extension formed on the tubular casing and arranged to be forced into frictional contact with said threaded shank.

3. A hand implement comprising a handle including a wooden core, and a tubular metallic casing receiving the core and extending the entire length thereof, a tubular extension formed on one end of the casing, a hand grip formed on one end of the wooden core, a blade including a threaded shank for insertion into the wooden core, the shank having its diameter gradually increased toward the lower end thereof, the tubular extension being adapted to be bent into frictional contact with said enlarged portion of the shank.

4. In a hand implement, a handle including a wooden core, a tubular metallic casing for receiving the core and extending the entire length thereof, a wooden hand grip formed on the core and extending beyond one end of the casing, a tubular extension formed on one end of the casing opposite to said handle and extending beyond said core, and a blade including a tapered threaded shank for insertion into the wooden core, the shank having its diameter gradually increased toward the blade, the terminal of the tubular extension being contracted into intimate frictional contact with the enlarged portion of the shank and said core.

PASQUALE DELLA MONICA.